(12) United States Patent
Laukamm et al.

(10) Patent No.: US 7,860,979 B2
(45) Date of Patent: Dec. 28, 2010

(54) DATA TRANSMISSION PROCESS

(76) Inventors: Thomas Laukamm, Rembrandtstrasse 28, Heilgenhaus (DE) 42579; Lars Laukamm, Rembrandtstrasse 28, Heilgenhaus (DE) 42579

( * ) Notice: Subject to any disclaimer, the term of this patent is extended or adjusted under 35 U.S.C. 154(b) by 1070 days.

(21) Appl. No.: 10/807,137

(22) Filed: Mar. 24, 2004

(65) Prior Publication Data
US 2005/0120129 A1    Jun. 2, 2005

(30) Foreign Application Priority Data
Dec. 1, 2003    (EP)    .................................. 03027575
Dec. 5, 2003    (EP)    .................................. 03027989

(51) Int. Cl.
*G06F 15/16*    (2006.01)
(52) U.S. Cl. ....................... 709/227; 709/203
(58) Field of Classification Search ........................ None
See application file for complete search history.

(56) References Cited
U.S. PATENT DOCUMENTS

| | | | |
|---|---|---|---|
| 5,950,172 A | 9/1999 | Klingman | |
| 6,725,222 B1 * | 4/2004 | Musgrove et al. | 707/10 |
| 2001/0034219 A1 * | 10/2001 | Hewitt et al. | 455/186.1 |
| 2002/0023123 A1 * | 2/2002 | Madison | 709/203 |
| 2002/0099591 A1 * | 7/2002 | Dyer | 705/10 |
| 2002/0124049 A1 * | 9/2002 | Gorodetsky et al. | 709/203 |
| 2002/0147776 A1 * | 10/2002 | Lippiner et al. | 709/204 |

* cited by examiner

*Primary Examiner*—Ario Etienne
*Assistant Examiner*—Clayton R Williams
(74) *Attorney, Agent, or Firm*—Roberts Mlotkowski Safran & Cole, P.C.; David S. Safran

(57) ABSTRACT

A process for transmission of data sets between at least one server and a client, a display data set on the server being accessible to the client via a connection to the server. The display data is automatically retrieved from the server, transmitted to the client and diplayed from the client. A request for inputting of response data is sent automatically from the client to the user of the client at least a partially overlapping in time with the display of the display data set which takes place from the client based on a query data set which is different from the display set. Additionally, for example, a modified Internet browser with a backward channel can be implemented, with which any Internet pages can be displayed, questioning can take place simultaneously with these Internet pages and the corresponding response data can be collected and evaluated centrally on the feedback server.

14 Claims, 2 Drawing Sheets

DATA TRANSMISSION PROCESS

BACKGROUND OF THE INVENTION

1. Field of the Invention

The invention relates to a data transmission process for transmission of data sets between at least one server and one client, there being a display data set which is kept on the server and which is accessible to the client via a connection which has been set up at least temporarily on the server, the display data set being automatically retrieved from the server via at a connection which has been set up at least temporarily, transmitted to the client and displayed from the client.

2. Description of Related Art

Here, the term "server" is defined as a facility which is able to hold a plurality of data sets and to make them available to other facilities, specifically the "clients". Here, data transmission between the server and the client is not limited to unidirectional data transmission from the server to the clients, but can also be bidirectional, so that data can also be transmitted from the clients to the server; this ultimately can be necessary for control.

These servers and clients can be, for example, Internet servers and computers connected to the Internet, such as PCs (personal computers) and also PDAs (personal digital assistant) as well as mobile phones with an Internet interface. However, the data transmission process described here is not limited to the area of servers and clients on the Internet. Rather, the data transmission process described here relates to all areas in which there can be servers which keep a plurality of data sets in order to be able to make them available to the clients via a network of fundamentally any kind. Other examples are broadcast transmission (radio and television) and transmission in mobile radiotelephone networks and transmission in LANs (local area networks), optionally configured as an intranet.

Simply for the sake of easier understanding and as a concrete example, reference is often made below to those servers and clients which are a component of the Internet and which are connected to one another via the Internet. For servers which are provided in the Internet and which can make available the data sets kept by them basically to any client with an Internet interface, data are transmitted on the basis of international standards such as the TCP/IP protocol (Transmission Control Protocol/Internet Protocol). The data sets kept on the server correspond to a certain code and are, for example, HTML files (Hypertext Markup Language). In the transmission of a HTML data set from a server to a client, at the client, the interpretation of the HTML commands takes place so that there is a corresponding display typically on the monitor of the client. In addition, various script languages are known with which an optionally animated display at the client can be achieved.

To display data sets kept on an Internet server, a suitable display program, a so-called browser, is necessary. This browser is able to interpret the data sets which have been transmitted from the server to the client and to convert them into a corresponding display. In addition, the browser also allows transmission of data from the client to the server. This is necessary, on the one hand, in navigation in the Internet, therefore ultimately to be able to access certain data sets of a server at all, and on the other hand, in this way, for example, those data sets which are necessary for transaction handling over the Internet can be transmitted to the server. If the user of a client with his client is visiting, for example, an online shop which is operated on an Internet server, it is ultimately not only necessary to transmit the corresponding sales pages from the server and receive them displayed, but also to transmit information with respect to desired products and other information, such as address and shipping information and payment information from the client to the server.

In the Internet browsers known from the prior art, this data transmission can take place from a client to a server via the retrieved Internet page. This is the case, for example, in the input of address data in order to obtain shipping of an order to this address. In addition, conventional Internet browsers allow the input of Internet addresses, either as IP numbers or via the pertinent domain names, in a window of the Internet browser in order to open the corresponding page which is desired by the user. It is essential in the existing Internet browser that only that type of data input and data transmission to a server is possible which is offered and allowed by the Internet page which has been retrieved at the time. This means that the user may not be able to transmit certain data desired by him or a third party when such an Internet page is retrieved with a source code to which he has no access and which he therefore cannot change according to his wishes for possible data transmissions to a server.

SUMMARY OF THE INVENTION

Based on the foregoing, it is a primary object of the present invention is to devise such a data transmission process with which, when a data set kept on a server is displayed at the client, data transmission which is independent of the displayed data set can take place.

Proceeding from the initially described data transmission process, the aforementioned object is achieved in that, at least partially overlapping in time with the display of the display data set which takes place from the client, based on a query data set which is different from the display data set, an input request for input of response data is sent automatically from the client to the user of the client.

Therefore, it is important to the invention that an input request which is based on a query data set which is different from the display data set is sent automatically to the user of the client via the client. Regardless of whether the display data set allows input and transmission of data to a server at all can therefore also be determined accurately using a query data set; this can be input for response data in the client.

Transferred to an Internet browser, this means that the input request based, according to the invention, on the query data set does not take place in the actual browser window in which the retrieved Internet page is displayed, but in another window with a form and content which is determined by the query data set. Based on the fact that the window which is based on the query data set with the input request and the actual browser window are displayed at least overlapping in time, it is, for example, possible to obtain answers to those questions which relate to the Internet page just displayed. Specifically, this means that, with the data transmission process of the invention, any Internet pages can be displayed to third parties with contents which cannot be influenced and changed and nevertheless information can be input on these Internet pages.

According to one preferred development of the invention, it is provided that the response data which have been input by the user upon the input request are automatically transmitted to the feedback server. Here, the feedback server can be determined independently of the display data set.

Therefore, in the picture of the Internet browser, the server on which the Internet page to be displayed is located, and the feedback server to which the response data are transmitted, can be different from one another. As one example of this process here, for the time being only, one market research study is named in which, in this way, information with respect to the assessment of the Internet page can be transmitted to the feedback server of a market research institute.

As already stated above, one important aspect of the invention lies in the fact that the display of the display data set which takes place from the client and the input request for input of response data overlap in time at least to a certain extent. However, according to one preferred development of the invention, it is provided that the display of the display data set which takes place from the client and the input request which takes place based on the query data set take place synchronously from the client to the user of the client for input of response data.

Transferred again to the Internet browser, this would mean that, for display of any Internet page in the actual browser window, in an additional window, for example, under the actual browser window, an input request takes place at the same time. After the input of response data, then a new Internet page in the actual browser window can be retrieved, for which, based on the same or a new query data set, an input request for input of response data in a separate window is in turn sent automatically.

Moreover, it is important to the invention that the query data set be different from the display data set. In particular, it is provided that the query data set be accessible to the operator of the data transmission process of the invention so that the operator of the data transmission process of the invention can set up and change the query data set according to the desired input request. To do this, the query data set, according to one preferred development of the invention, can be kept at the client. According to another preferred development of the invention, it is however also possible to transmit the query data set online, specifically at the start or during the data transmission process via a connection which has been set up at least temporarily from the query data server to the client.

In order to remain in the picture of the Internet browser, therefore there can be an Internet browser which has been modified in accordance with the invention, specifically an Internet browser with a backward channel, which, for example, runs on a PC. The query data set itself is kept on an query data server, and upon activation of the corresponding query data set by the browser with the backward channel, on the one hand, an Internet page which is connected to the corresponding query data set is automatically opened, and on the other hand, the input request which is associated with the query data set is automatically displayed in the browser with the backward channel. The backward channel function of the browser involves the response data which have been input upon the input request being automatically transmitted to a feedback server which is determined by the query data set.

Here, according to one preferred embodiment of the invention, it can be provided that the feedback server is used as the query data server. However, it should be pointed out that basically different and also several query data servers and feedback servers can be used.

The response data which have been input can basically also be input in facilities other than the client operated by the user and can be transmitted from this facility to the feedback server. However, according to one preferred development of the invention, it is provided that the input of the response data takes place via the client and automatic transmission of the response data to the feedback server likewise takes place via the client, preferably online. Online transmission is not absolutely necessary and the response data which have been input can basically be stored for the time being at the client. Online transmission to the feedback server is however advantageous in that the response data are immediately available in this way for evaluation.

According to one preferred development of the invention, it is furthermore provided that for display of the display data set, for the input request based on the query data set, and for the input of the response data, a preferably shared display device is used. When using a PC, the display device will typically be a monitor which is connected to the PC or integrated into it. Moreover, for the input of response data, an input device is necessary. When using a PC, this is typically a keyboard and/or a pointing device like a mouse. However, basically other input possibilities such as voice input via a microphone are also conceivable.

It was pointed out above that, according to one preferred development of the invention, a plurality of display data sets can be transmitted in succession in time from the server or from one or more other servers to the client and can be displayed by the client, the respective input request for input of response data being sent automatically from the client to the user of the client at least partially overlapping in time with the display of the respective display data set which takes place from the client based on a respective query data set which differs from the display data set, the respective response data which have been input thereupon by the user being transmitted automatically to the feedback server.

In doing so, the different display data sets can be provided on the same or on different servers. They are in any case always different from the query data set. In addition the query data server and the feedback server as stated above can be combined in a common server, differently from the servers from which the display data sets are transmitted to the client.

Finally, one preferred development of the invention lies especially in that there is a predetermined control mechanism in which the display data set which is to be displayed at the time and thus the corresponding server on which the display data set is kept, and the pertinent respective query data set for the input request are fixed. Furthermore, the sequence of display data sets to be displayed can be fixed in the control mechanism.

If there is a predetermined sequence of display data sets to be displayed, the corresponding display data sets can be displayed in succession, and there can automatically be a change to the next display data set. In this connection, the possibility of changing to any of the display data sets provided according to the control mechanism can fundamentally be made available. This can mean especially that there is a change to the preceding display data set, to any already displayed display data set and/or a change to any display data set not yet displayed. Here, it applies that the control mechanism is either kept at the client, or is transmitted preferably online at the start or during the data transmission process via a connection which has been set up at least temporarily from the query data server to the client.

In order to ultimately also remain here in the picture of the Internet browser, it could therefore be provided that, from the already addressed modified browser with a backward channel, the control mechanism kept in the Internet on the query data server is activated, and then, one Internet page at a time is displayed automatically in succession in the actual browser window and a corresponding input request is displayed in a, for example, underlying window. The response data are then automatically transmitted to the feedback server upon the input of response data or upon a separate confirmation or at least stored for the time being at the client in order to then change automatically to the next Internet page with a corresponding input request in a separate window. To change from the response data which have already been input, it can also be provided that it is possible to jump back to already displayed Internet pages.

With respect to the addressed browser with a backward channel, it can otherwise be provided that it is a genuine client program, therefore a program which can run under the client's operating system and is also executed at the client itself. In order to always use an up-to-date version of the client program, according to one preferred development of the invention, it can be provided that, with each start of the client program, an inquiry on a predetermined server provided in the Internet takes place as to whether the present version of the client program is still up-to-date. If the version should be outdated, an up-to-date program is transmitted to the client over the Internet and only then started.

However, the invention is not limited to the fact that, in the picture of the Internet browser, the data transmission process is controlled by a program run at the client. Rather, it is also possible to provide a control which proceeds centrally on the server for the process of the invention and to transmit only the corresponding display data to the client for this purpose. The client would acquire simply a terminal function; this would also enable especially the use of low data transmission speeds and technically simple devices, for example, with less memory and low processor performance. In this case, the control mechanism could not be transmitted to the client, but to the server on which the process is running.

The process of the invention can be carried out without interruption. According to one preferred development of the invention, however, the possibility of carrying out the process with at least one interruption can also be made available. To do this, it is preferably provided in particular that the progression of the process is automatically protocolled so that the current status is available at any time and an interrupted process can be re-started at any time. Here, protocolling takes place preferably on a server which is different from the client. In this way, an interrupted process can then be restarted at the correct point when the process is to be continued from another client as long as there is access from this other client to the server on which protocolling has taken place. In this connection, it can otherwise also be advantageous to transmit the response data directly online to the feedback server and collect it not only at the client.

Finally, according to one preferred development of the invention, it is provided that the process has an automatic password query as the first step when it starts. This means that a query data set is only displayed by the client when the password query has transpired positively. In this way, it can be ensured that the process can be used only by predetermined users so that the acquired response data do in fact originate from these predetermined users and not from just any users.

In particular, there is a plurality of possibilities for embodying and developing the data transmission process of the invention. To do this, reference is made to the following detailed description of preferred embodiments of the invention with reference to the accompanying drawings.

DETAILED DESCRIPTION OF THE INVENTION

Figure 1:
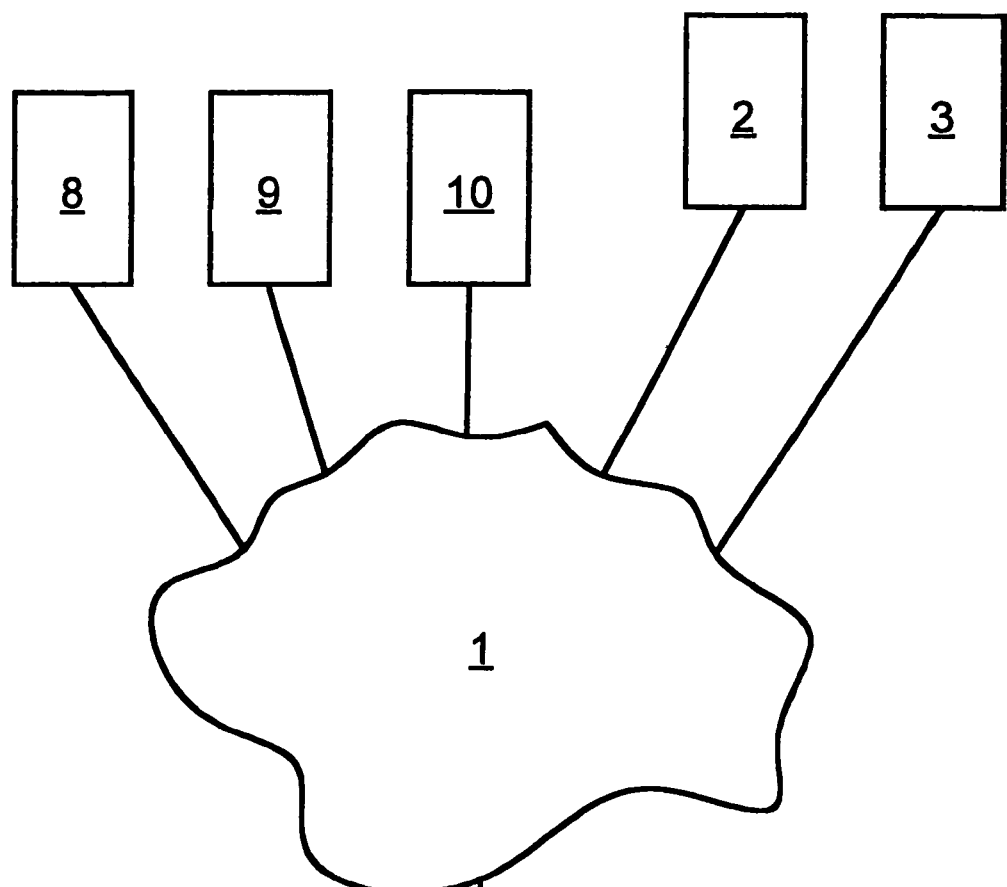
FIG. 1 schematically shows the facilities which are interconnected over the Internet and which are used for the data transmission process according to one preferred embodiment of the invention, and FIG. 2 schematically shows the progression of the data transmission process according to one preferred embodiment of the invention using the example of an Internet browser.

A data transmission process according to one preferred embodiment of the invention is explained below; it can be carried out on the Internet 1 and with facilities which are interconnected over the Internet 1. There are a query data server 2 and a feedback server 3 which make available all the components necessary for the data transmission process according to the preferred embodiment of the invention described here. In the query data server 2, which is accessible over the Internet 1 to basically any client 4, here a PC, a program which can run at the client 4 is kept via which the data transmission process runs and is controlled. Furthermore, in the query data server 2, a plurality of query data sets and a control mechanism are available; the latter establishes which Internet pages together with which query data sets are displayed in succession in a predetermined sequence via the program which can run on the client 4, a browser with a backward channel. The client 4 which is made as a PC has a keyboard 5 and a mouse 6 here as the input devices while there is a monitor 7 as the output means.

The execution of the data transmission process according to the preferred embodiment of the invention described here is as follows: The user of the client 4 initiates the data transmission process for example, by his opening over a conventional browser, an Internet page which is kept on the query data server 2 and by actuating on this page an operating surface which is labeled "market research survey." Thereupon, it is automatically recognized that a data transmission process is to be started for which the addressed browser with the backward channel must be used. It is automatically checked whether this modified browser with the backward channel is at the client 4. If it is not present, it is always automatically loaded onto the client from the query data server 2 via the Internet 1. To do this, an up-to-date version of the modified browser with the backward channel is always stored on the query data server 2. If the browser with the backward channel is already in the client 4, it is automatically checked whether the version of the present browser with the backward channel corresponds to the up-to-date version stored on the query data server 2 and optionally the up-to-date version of the query data server 2 is automatically transmitted to the client 4 via the Internet 1.

After the start of the browser with the backward channel, determined by the control mechanism kept on the query data server 2, on the one hand, in a window of the browser with the backward channel, an Internet page which is kept on a server 8 which is connected to the Internet 1 is automatically opened, i.e., a display data set which is kept on the first server 8 is displayed. On the other hand, at the same time, a query data set which is kept on the query data server 2 is used to automatically display an input request simultaneously with the Internet page.

Figure 2:
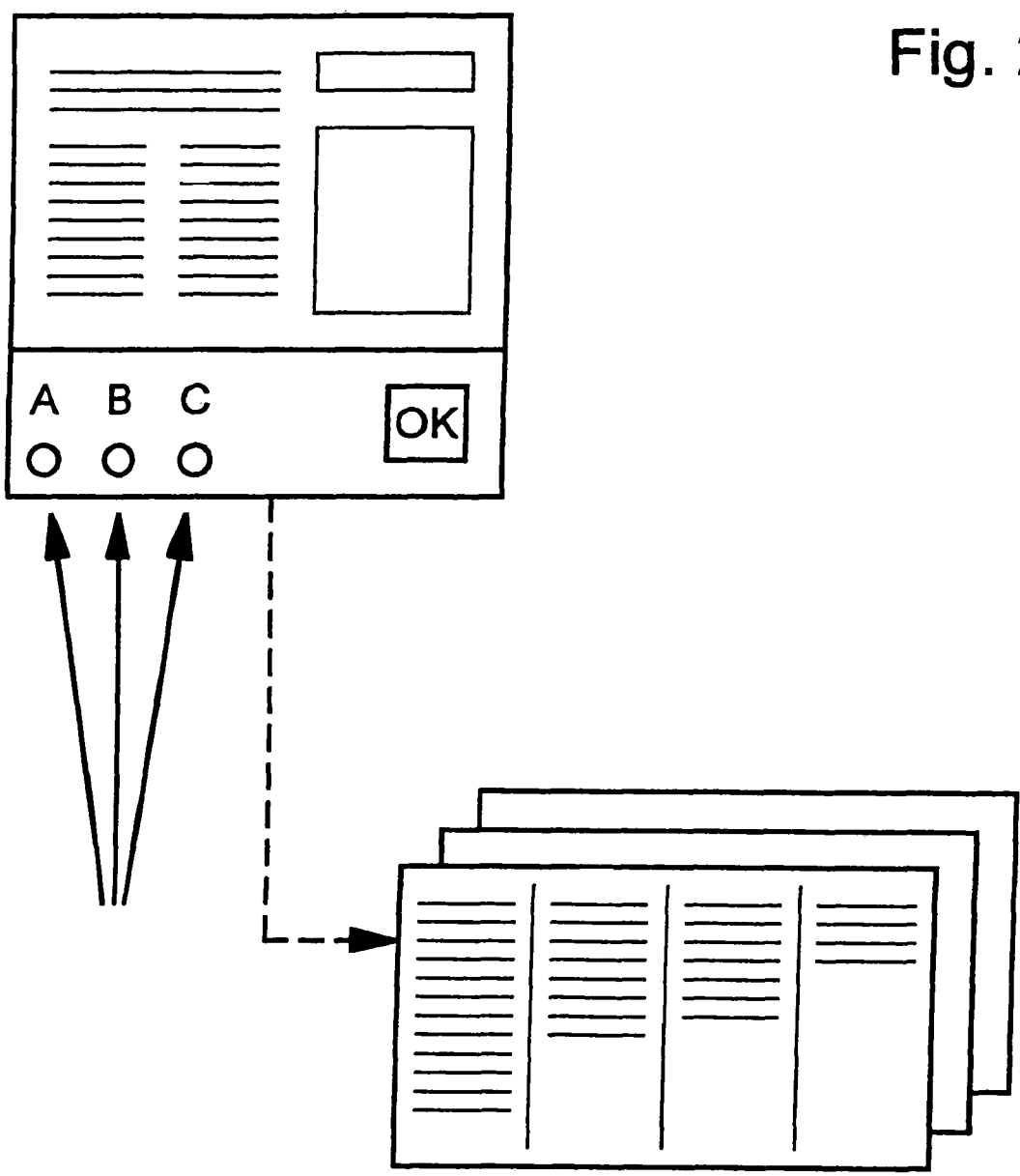

The structure of the display of the browser with the backward channel is shown schematically in FIG. 2. There it is shown that in an upper window one Internet page is displayed, specifically the display data set which is kept on the first server 8, while under it in a separate window an input request is displayed at the same time. As is furthermore apparent from FIG. 2, three response possibilities A, B and C are made available. Upon acknowledgement of the input with a click on the OK button the response data which have been input, therefore the response A, B, or C, are automatically transmitted to the feedback server 3. There the response data, as shown schematically in FIG. 2, are automatically stored in a database and are then available for further processing or evaluation.

The control mechanism kept on the query data server 2 establishes what kind of display data set from the next server together with what kind of a query data set for the next step is used. According to the preferred embodiment of the invention described here, in the next step, specifically after acknowledging the OK button, a predetermined display data set of a second server 9 together with an input request which is based on the pertinent query data set is automatically displayed. In doing so, the input request can be different from the input request displayed before, but the same input request can also be used. By acknowledging the OK button then a display data set which is kept on a third server 10 together with a corresponding input request is automatically displayed, etc.

Here, it must be pointed out that the different display data sets which are displayed in succession need not necessarily be present on servers 8, 9, 10 which are different from one another. Rather it can also be provided that several or all display data sets are present on a single server 8. What is important is simply that the query data server 2 and the feedback server 3 are accessible to the operator of the data transmission process according to the embodiment of the invention described here so that he can influence the control mechanism and thus on the one hand the displayed display data sets and on the other hand the specific formulation of the query data sets which are associated with it. Therefore a "foreign server" like the first server 8, the second server 9 or the third server 10 is not considered the query data server or the feedback server. Hoever, it would be fundamentally possible to use these display data sets for the data transmission process described here, which sets are kept on the query data server 2 or on the feedback server 3 itself.

To produce the control mechanism and the query data sets with which the corresponding input requests are associated, there can be a separate program. It can basically run on any device as long as the data produced with it, therefore the control mechanism and the query data sets, can be transmitted to the query data server 2 from where they can be reached for the client 4.

The data transmission process of the invention can furthermore be used in a plurality of applications. The possibility of conducting market research by means of the data transmission process under consideration was already mentioned above. Specifically, for example, online questioning about the effect and assessment of Internet pages of various suppliers is possible. Here, different Internet pages, optionally from different suppliers, are displayed automatically in succession, and at the same time, an input request'takes place automatically, for example, how the respective Internet page is assessed. Possible response data would be, for example: "very good", "good", "mediocre", "not at all". The response data obtained in this way are then centrally present after automatic transmission, specifically on the feedback server 3, in particular its also being especially advantageous that at the same time a plurality of individuals being surveyed can be occupied with online questioning so that online questioning can be completed in the shortest time, specifically within a few hours, including the evaluation of response data.

Another application of the data transmission process as claimed in the invention is in the area of eLearning, therefore learning and monitoring of students via electronic media. Via the intended backward channel continuous monitoring of learning can be carried out and it can even be provided that tests or examinations be administered using the data transmission process of the invention. Here again, a very important advantage lies in direct acquisition of response data centrally on the feedback server 3 so that the response data can be evaluated easily and immediately. However, here, eLearning comprises not only the secondary school or university level, but can also be used for employee classes so that a group leader can comfortably attain feedback from his employees with respect to their respective qualifications in the corresponding area.

Finally, one important application of the data transmission process in accordance with the invention is also offering a so-called "Guided Tour". Here, it is established using the control mechanism in which sequence predetermined Internet pages are displayed in succession on essentially any Internet servers. To do this, on the one hand, input requests, therefore additional overlays and information, can be given, the response data not necessarily having to be input and acquired. The additional window which is intended basically for the input request can also be provided in the case of a guided tour only for commenting on or complementing the displayed Internet page to which the offeror of the "Guided Tour" does not have access. Otherwise, it can be automatically protocolled over the backward channel whether and which Internet pages have been displayed within the framework of the "Guided Tour".

What is claimed is:

1. Data transmission process for transmission of data sets between at least one query data server, at least one display data server and at least one client comprising the steps of:

upon initiation of a data transmission process by a user of the at least one client using a browser without a backward channel, automatically recognizing with a control mechanism on the at least one query data server that the data transmission process to be started requires use of a browser with a backward channel;

causing a browser with the backward channel to be started on the at least one client and using the browser with the backward channel for the data transmission process, the data transmission process comprising the steps of:

maintaining a display data set on the at least one display data server and making the display data set accessible to the at least one client via an online connection which has been set up at least temporarily from the at least one client to the at least one display data server, automatically retrieving and transmitting the display data set from the at least one display data server to the at least one client via the online connection which has been set up at least temporarily, and displaying the retrieved display data set at the at least one client for viewing by the user in a first display window, initiating of a query process by an input from the user in a second display window, and in response to said input, at least partially overlapping in time with displaying of the display data set retrieved from the at least one display data server in said first display window, based on a query data set which is different from the display data set, automatically sending from the at least one query data server to the user of the at least one client, an input request for inputting of response data from the at least one client, wherein the input request is displayed in the second display window at least partially overlapping in time with retrieved data displayed in said first display window.

2. Data transmission process as claimed in claim 1, wherein the response data input by the user in response to the input request are automatically transmitted to the at least one feedback server.

3. Data transmission process as claimed in claim 1, wherein displaying of the display data set retrieved from the at least one display data server and the input request based on the query data set take place synchronously from the at least one client to the user of the at least one client for input of response data.

4. Data transmission process as claimed in claim 2, wherein the query data set is transmitted automatically online via a connection which has been set up at least temporarily from the at least one query data server to the at least one client.

5. Data transmission process as claimed in claim 4, wherein the at least one feedback server is used as at least one query data server.

6. Data transmission process as claimed in claim 2, wherein the input of the response data and automatic transmission of the response data to the at least one feedback server takes place via the at least one client.

7. Data transmission process as claimed in claim 1, wherein a shared display device is used for displaying of the display data set, for inputting requests based on the query data set and for inputting of response data.

8. Data transmission process as claimed in claim 1, wherein a plurality of display data sets are automatically transmitted in succession in time from the at least one display data server to the at least one client and are displayed by the at least one client, a respective request for inputting of response data being sent automatically from the at least one client to the user thereof in a manner at least partially overlapping in time with displaying of the respective display data set from the at least one client based on a respective query data set which differs from the display data set.

9. Data transmission process as claimed in claim 8, wherein there is a predetermined control mechanism in which the display data set which is to be displayed and the pertinent respective query data set for the input request, are fixed for controlling of an automatic progression.

10. Data transmission process as claimed in claim 9, wherein the control mechanism is kept at the at least one client or is transmitted automatically via a connection which has been set up at least temporarily from the at least one query data server to the client.

11. Data transmission process as claimed in claim 1, wherein the progression of the process is automatically protocolled.

12. Data transmission process as claimed in claim 1, wherein the automatic protocolling is performed on at least one server which is different from the at least one client.

13. Data transmission process as claimed in claim 1, further comprising performing the data transmission process by the user of the at least one client using the browser over a browser channel different from the backward channel.

14. Data transmission process as claimed in claim 1, further comprising initiating of the query process by the input from the user in the second display window, the second display window being provided in association with and adjacent to the first display window.

* * * * *